United States Patent
Huang et al.

(10) Patent No.: US 10,054,734 B2
(45) Date of Patent: Aug. 21, 2018

(54) LIQUID CRYSTAL DISPLAY WITH BACKLIGHT

(71) Applicant: Apple Inc., Cupertino, CA (US)

(72) Inventors: Yi Huang, Santa Clara, CA (US); Xinyu Zhu, Cupertino, CA (US); Jun Qi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 14/881,062

(22) Filed: Oct. 12, 2015

(65) Prior Publication Data

US 2016/0327822 A1 Nov. 10, 2016

Related U.S. Application Data

(60) Provisional application No. 62/159,146, filed on May 8, 2015.

(51) Int. Cl.
*G02F 1/1335* (2006.01)
*F21V 8/00* (2006.01)

(52) U.S. Cl.
CPC ....... *G02B 6/0073* (2013.01); *G02F 1/13362* (2013.01); *G02F 1/133615* (2013.01)

(58) Field of Classification Search
CPC ............. G02B 6/0073; G02F 1/133615; G02F 1/13362; G02F 2001/133638
USPC .......................................................... 349/65
See application file for complete search history.

(56) References Cited

U.S. PATENT DOCUMENTS

| 5,751,388 | A | 5/1998 | Larson |
| 5,828,488 | A | 10/1998 | Ouderkirk et al. |
| 6,002,829 | A * | 12/1999 | Winston ............... F21V 5/02 385/129 |
| 6,352,350 | B1 | 3/2002 | Ma |
| 7,006,173 | B1 | 2/2006 | Hiyama et al. |
| 7,054,681 | B2 | 6/2006 | Hinata et al. |
| 7,633,678 | B2 | 12/2009 | Takahashi et al. |
| 8,251,563 | B2 | 8/2012 | Papakonstantinou et al. |
| 8,350,997 | B2 | 1/2013 | Lee et al. |
| 2002/0176036 | A1* | 11/2002 | Kaneko ............ G02F 1/133615 349/65 |
| 2005/0024558 | A1 | 2/2005 | Toyooka |
| 2006/0056166 | A1 | 3/2006 | Yeo et al. |

(Continued)

FOREIGN PATENT DOCUMENTS

| JP | 2000356769 | 12/2000 |
| JP | 2005208568 | 8/2005 |
| WO | 201209974 | 7/2012 |

*Primary Examiner* — Lucy Chien
(74) *Attorney, Agent, or Firm* — Treyz Law Group, P.C.; G. Victor Treyz; David K. Cole (57) ABSTRACT

A display may have an array of pixels that display images for a user. The backlight unit may have a light-guide layer. An array of light-emitting diodes may emit light into an edge of the light-guide layer. The light guide layer may overlap a backlight reflector. A quarter wave plate may be interposed between the light guide layer and the backlight reflector. A turning film may be interposed between a lower polarizer in the array of pixels and the light guide layer. The lower polarizer may be a reflective polarizer. Light exiting the upper surface of the turning film may have a dominant polarization. A half wave plate may be used to rotate the dominant polarization into alignment with a pass axis of the reflective polarizer.

19 Claims, 6 Drawing Sheets

(56) References Cited

U.S. PATENT DOCUMENTS

| | | |
|---|---|---|
| 2006/0105117 A1 | 5/2006 | Kim et al. |
| 2006/0285359 A1 | 12/2006 | Yang et al. |
| 2006/0290253 A1 | 12/2006 | Yeo et al. |
| 2007/0153384 A1 | 7/2007 | Ouderkirk et al. |
| 2008/0030656 A1 | 2/2008 | Watson et al. |
| 2009/0161044 A1 | 6/2009 | Ge et al. |
| 2010/0302798 A1 | 12/2010 | Papakonstantinou et al. |
| 2011/0273643 A1 | 11/2011 | Arai et al. |
| 2012/0200811 A1 | 8/2012 | Sakai et al. |
| 2013/0286678 A1* | 10/2013 | Sugiyama ............ G02B 6/0011 362/602 |
| 2013/0335823 A1 | 12/2013 | Epstein et al. |
| 2015/0248033 A1 | 9/2015 | Zhu et al. |

* cited by examiner

LIQUID CRYSTAL DISPLAY WITH BACKLIGHT

This application claims the benefit of provisional patent application No. 62/159,146 filed on May 8, 2015, which is hereby incorporated by reference herein in its entirety.

BACKGROUND

This relates generally to electronic devices, and more particularly, to electronic devices with displays.

Electronic devices often include displays. For example, cellular telephones, tablet computers, and laptop computers often include displays for presenting information to a user.

Liquid crystal displays contain a layer of liquid crystal material sandwiched between upper and lower polarizers. Pixels in a liquid crystal display contain thin-film transistors and electrodes for applying electric fields to the liquid crystal material. The strength of the electric field in a pixel controls the polarization state of the liquid crystal material and thereby adjusts the brightness of the pixel. A liquid crystal display may have an array of color filter elements to provide the display with the ability to display color images.

The pixels in the liquid crystal display can be illuminated using a backlight unit. The backlight unit may include a light guide layer. The light guide layer may be formed from a transparent material such as a transparent polymer. An array of light-emitting diodes may emit light into the edge of the light guide layer. The light that is emitted into the edge of the light guide layer may be distributed throughout the light guide layer in accordance with the principle of total internal reflection.

The light guide layer may be provided with light scattering features that scatter the light that is traveling within the interior of the light guide layer. Light that is scattered outwards from the light guide layer through the pixels of the liquid crystal display can serve as backlight for the display.

Display brightness can be adversely affected by the optical characteristics of the display. As an example, the lower polarizer in a display may transmit only a fraction of the light that scattered outwards from the light guide layer, decreasing backlight efficiency and the brightness level of the display.

It would therefore be desirable to be able to provide improved displays such as improved backlit liquid crystal displays.

SUMMARY

A display may have an array of pixels that display images for a user. The array of pixels may be formed from liquid crystal display layers. The array of pixels may be provided with backlight illumination by a backlight unit.

The backlight unit may have a light-guide layer. An array of light-emitting diodes may emit light into an edge of the light-guide layer. The light guide layer may overlap a backlight reflector. A quarter wave plate may be interposed between the light guide layer and the backlight reflector.

The array of pixels may include upper and lower polarizers. A liquid crystal layer may be interposed between the upper and lower polarizers. The lower polarizer may be a reflecting polarizer. A turning film may be interposed between the reflecting polarizer and the light guide layer. The turning film may have prisms with a prism axis that is perpendicular to the direction in which the light is emitted from the light-emitting diodes. The prisms of the turning film may face the light guide layer.

Light exiting the upper surface of the turning film may have a dominant polarization. A half wave plate may be interposed between the turning film and the reflective polarizer. The half wave plate may be used to rotate the dominant polarization into alignment with a pass axis of the reflective polarizer. The quarter wave plate below the light guide layer may be used to rotate the polarization of light emitted from the bottom of the light guide layer into alignment with the dominant polarization.

DETAILED DESCRIPTION

Electronic devices may include displays. The displays may be used to display images for a user. Illustrative electronic devices that may be provided with displays are shown in FIGS. 1, 2, 3, and 4.

Figure 1:
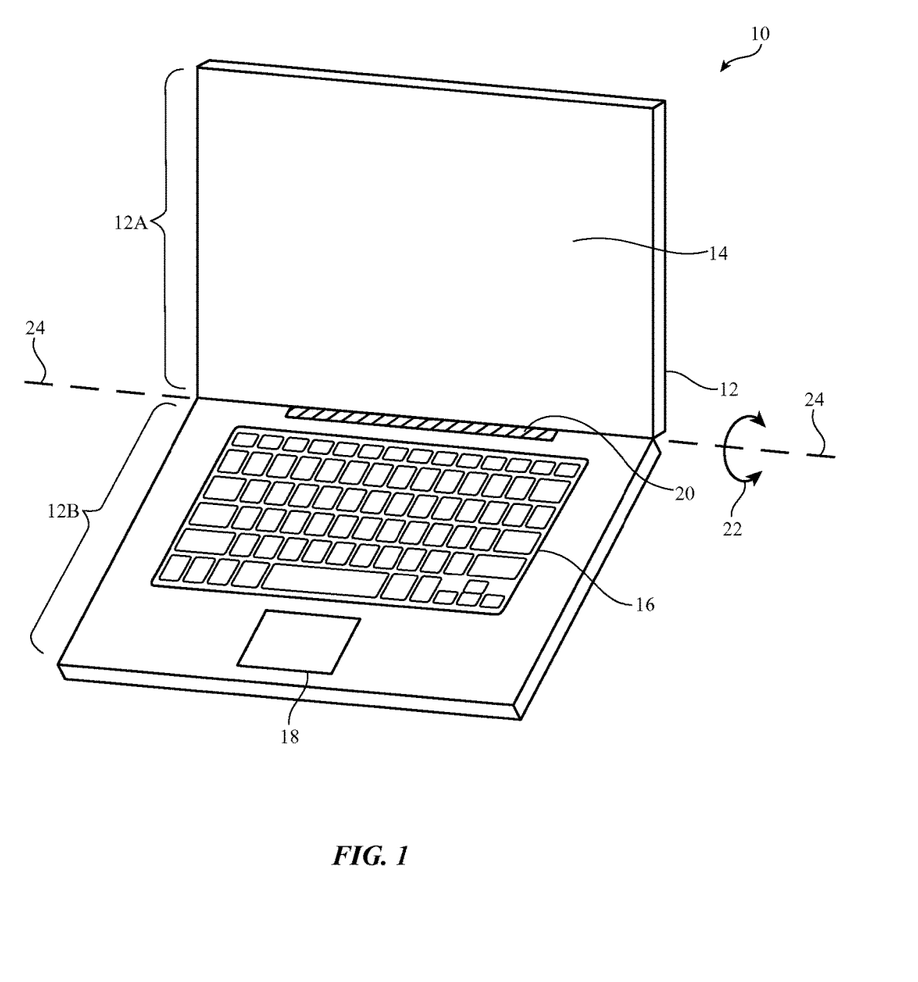
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
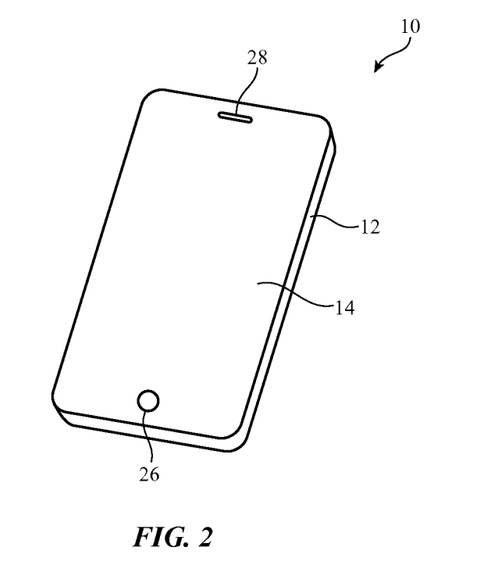
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
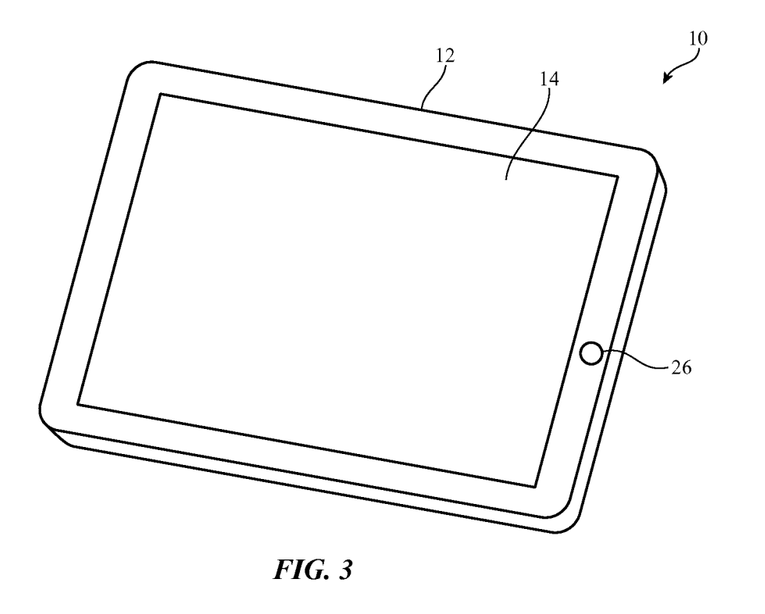
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
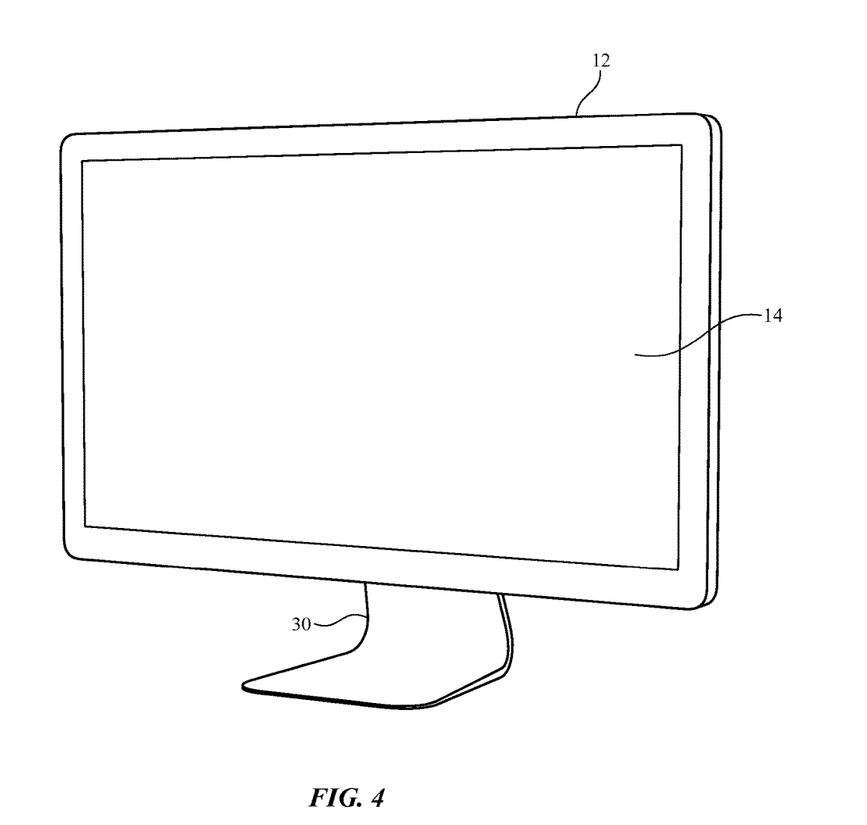
FIG. 4 is a perspective view of an illustrative electronic device such as a computer display with display structures in accordance with an embodiment.

FIG. 4 shows how electronic device 10 may be a display such as a display with an embedded computer, a display without an embedded computer, or other suitable equipment for displaying images. With this type of arrangement, housing 12 for device 10 may be mounted on a support structure such as stand 30 or stand 30 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor or other display containing an embedded computer, a tablet computer, a cellular telephone, a media player, or other handheld or portable electronic device, a smaller device such as a wrist-watch device, a pendant device, a headphone or earpiece device, or other wearable or miniature device, a computer display or other monitor that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include pixels formed from liquid crystal display (LCD) components. A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
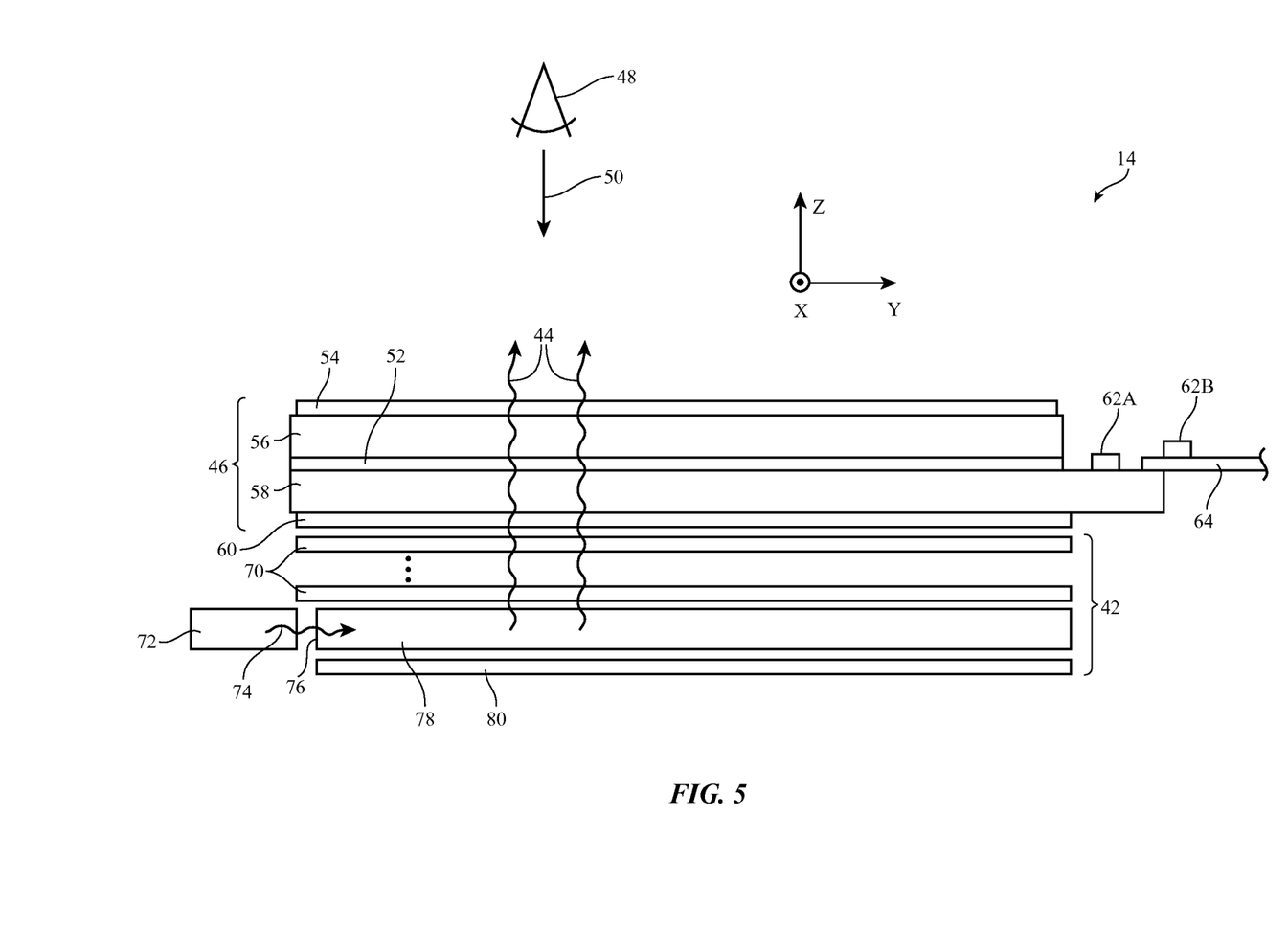
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight illumination 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide layer such as light guide layer 78. Light guide layer 78 may be formed from a transparent material such as clear glass or plastic (e.g., molded plastic such as polymethyl methacrylate or other clear thermoplastic that forms a light guide plate, a thin flexible plastic film such as a sheet of polycarbonate or other thin polymer film, etc.). During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide layer 78 due to the principal of total internal reflection. Light guide layer 78 may include light-scattering features such as pits or bumps or other light-scattering structures. The light-scattering features may be located on an upper surface and/or on an opposing lower surface of light guide layer 78. Light source 72 may be located at the left of light guide layer 78 as shown in FIG. 5 or may be located along the right edge of layer 78 and/or other edges of layer 78.

Light 74 that scatters upwards in direction Z from light guide layer 78 may serve as backlight 44 for display 14.

Light 74 that scatters downwards may be reflected back in the upwards direction by reflector 80. Reflector 80 may be formed from a reflective material such as a layer of plastic covered with a dielectric mirror thin-film coating. Reflective tape (e.g., white plastic tape or tape formed from other reflective materials) may be incorporated into the backlight reflector for display 14. For example, backlight structures 42 may include a strip of tape that runs along the edge of reflector 80 that is adjacent to light-emitting diodes 72.

Backlight structures 42 may include optical films 70. Optical films 70 may include diffuser layers for helping to homogenize backlight 44 and thereby reduce hotspots, compensation films for enhancing off-axis viewing, and light collimating films such as turning films (prism films, brightness enhancement films, etc.) for collimating backlight 44. Optical films 70 may overlap the other structures in backlight unit 42 such as light guide layer 78 and reflector 80. For example, if light guide layer 78 has a rectangular footprint in the X-Y plane of FIG. 5, optical films 70 and reflector 80 may have a matching rectangular footprint. If desired, films such as compensation films may be incorporated into other layers of display 14 (e.g., polarizer layers).

Figure 6:
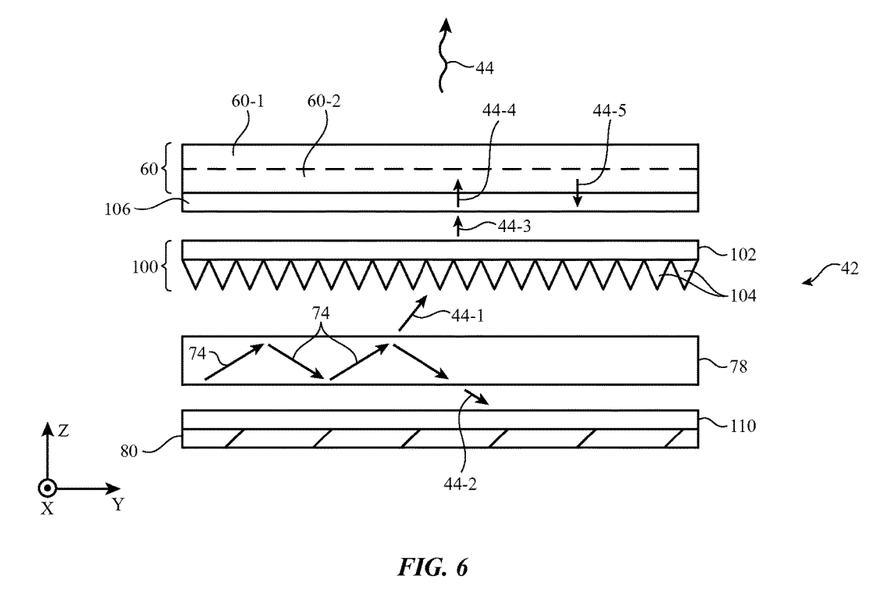
FIG. 6 is a cross-sectional side view of a portion of an illustrative backlight unit in accordance with an embodiment.
Figure 7:
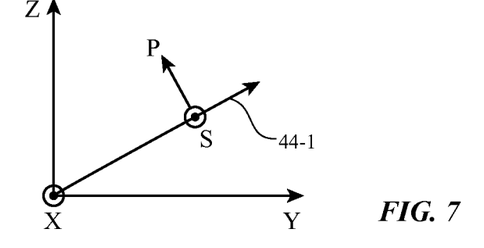
FIG. 7 is a diagram showing how light that is emitted from the light guide layer in a display backlight unit of the type shown in FIG. 6 may be polarized in accordance with an embodiment.

To enhance backlight efficiency, backlight unit 42 may be provided with structures of the type shown in FIG. 6. As shown in FIG. 6, backlight unit 42 may include light guide layer 78. Light 74 may be distributed throughout layer 78 in accordance with the principle of total internal reflection. Light scattering features in layer 78 may cause some of light 74 to escape upwards as light 44-1 and may cause some of light 74 to escape downwards as light 44-2. Light 44-1 and light 44-2 may have different polarizations (e.g., light 44-1 may be predominantly p-polarized and light 44-2 may be predominantly s-polarized). The diagram of FIG. 7 shows an illustrative ray of light 44-1 exiting the upper surface of light guide layer 78. Different rays of light 44-1 have different angular directions and different polarizations. Ray of light 44-1 of FIG. 7 is shown as an example.

Backlight unit 42 may have a light collimating film such as turning film 100. Turning film 100 may be formed from elongated ridge-shaped prisms 104 formed on substrate 102 and may sometimes be referred to as a prism film. The prisms may have triangular cross-sectional shapes that point upward towards lower polarizer 60 or that point downward towards light guide film 78, as shown in FIG. 6. An optional diffuser layer may, if desired, be interposed between film 100 and polarizer 60.

Substrate 102 of turning film 100 may be formed from a layer of clear polymer such as a polyethylene terephthalate (PET) layer. Prisms 104 may be formed from a clear polymer that is deposited and embossed or otherwise patterned onto the surface of substrate 102. Other techniques for forming turning film 100 may be used if desired. Moreover, the shapes of the optical features on the light collimating film of backlight unit 42 may be different (e.g., the periodicity of the prisms or other features may vary as a function of position on the surface of the film to reduce Moire effects that might arise due to interference between these features and the rows and columns of pixels in display 14, the shapes of the downward protruding features may have rounded cross-sectional shapes or other shapes with non-triangular profiles, shapes other than elongated ridges etc.).

In the example of FIG. 6, the ridge shaped protruding features of film 100 (i.e., elongated prisms 104) extend in parallel ridges into the page in the orientation of FIG. 6 and are form a series of parallel grooves. The groove axis (sometimes referred to as the prism axis) of turning film 100 is parallel to the X axis and is perpendicular to the Y axis. Light rays 74 from light-emitting diodes 72 are emitted in the Y direction into edge 76 of light guide layer 78 (i.e., light rays 74 may propagate in a direction that is perpendicular to the prism axis of turning film 100). Other orientations for the prism axis (groove axis) of turning film 100 may be used, if desired.

Figure 8:
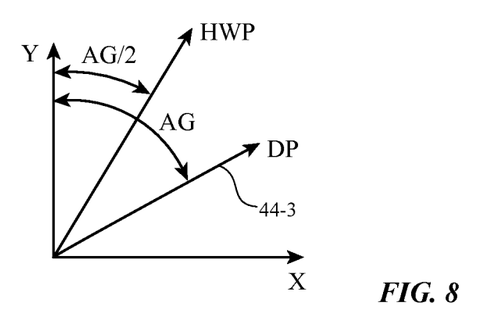
FIG. 8 is a diagram showing how light may be polarized upon exiting from a turning film in a display backlight unit in accordance with an embodiment.

After passing through turning film 100, light 44-1 becomes collimated and is more aligned with vertical axis Z (see, e.g., collimated light 44-3 of FIG. 6). The polarization of light 44-3 is changed from that of light 44-1 due to optical interactions between light 44-1 and turning film 100. FIG. 8 is a diagram in which the polarization of light 44-3 has been projected onto the X-Y plane. As shown in FIG. 8, light 44-3 may be characterized by a dominant polarization DP that is oriented at an angle AG with respect to the Y-axis (in the X-Y plane).

In the illustrative arrangement of FIG. 6, lower polarizer 60 has a pass axis that is aligned with the Y-axis (perpendicular to the prism axis of turning film 100). Half-wave plate 106 is interposed between polarizer 60 and turning film 100. Half-wave plate 106 may, for example, be attached to the lower surface of lower polarizer 60 with adhesive. The optical axis of half-wave plate 106 may be oriented along vector HWP of FIG. 8.

Figure 9:
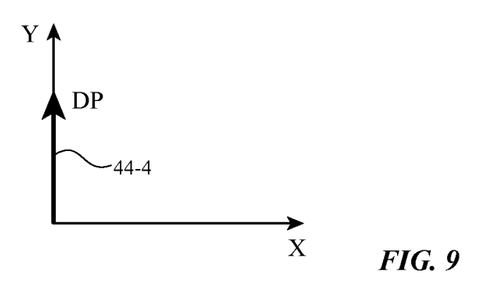
FIG. 9 is a diagram showing how light may be polarized upon exiting from a half wave plate in a display backlight unit in accordance with an embodiment.

The optical axis of the half-wave plate is preferably oriented at an angle AG/2 with respect to polarizer pass axis Y (i.e., the optical axis of half-wave plate 106 bisects the angle AG that characterizes the orientation of dominant light polarization DP with respect to pass axis Y). As a result, the light of dominant polarization DP (light 44-3) is rotated by an angle AG into alignment with pass axis Y as this light passes through half-wave plate 106, as illustrated in FIG. 9. As shown in FIG. 9, the orientation of dominant polarization DP for light 44-4 that is exiting the upper surface of half-wave plate 106 is aligned with pass axis Y. Because the dominant polarization of light 44-4 is aligned with the pass axis of polarizer 60, light 44-4 can be transmitted through polarizer 60 with minimized loss to serve as backlight illumination 44 for display 14. The use of half-wave plate 106 therefore helps to rotate the dominant polarization of the backlight that is exiting turning film 100 into alignment with the pass axis of polarizer 60 to minimize losses.

Polarizer 60 may be a reflective polarizer formed from polarizer layers 60-1 and 60-2. Layer 60-2 may be attached to the lower surface of layer 60-1 with a layer of adhesive or other suitable attachment mechanism. Polarizer layer 60-1 may be a non-reflective polarizer layer that has a pass axis aligned with axis Y. Polarizer layer 60-2 may have a pass axis aligned with axis Y and may be a reflective polarizer layer (i.e., a polarizer that reflects light with off-axis polarizations to produce reflected light 44-5). Other types of reflective polarizer structures may be used for forming polarizer 60, if desired. The illustrative configuration of FIG. 6 in which reflective polarizer 60 includes a pair of polarizer films is merely an example.

Reflected light 44-5 that is directed downwards from reflective polarizer 60 to backlight reflector 80 may be reflected off of reflector 80 back in upwards direction Z through polarizer 60. When traversing the layers of backlight unit 42, the polarization of reflected light 44-5 may become scrambled, so at least some of the recycled light 44-5 that is being reflected off of reflector 80 and that is traveling in upwards direction Z will be polarized along pass axis Y when reaching polarizer 60 and will pass through polarizer 60 to contribute to backlight 44. The presence of reflective polarizer portion 60-2 of bottom polarizer 60 (e.g., the use of a reflective polarizer to implement polarizer 60) therefore helps to avoid light loss due to mismatches between the polarization of light 44-4 and the pass axis of polarizer 60.

Light 44-1 that is scattered out of the top surface of light guide layer 78 has predominantly p polarization, whereas light 44-2 has predominantly s polarization. A quarter wave plate such as quarter wave plate 110 may be attached to the upper surface of reflector 80 (e.g., using a layer of adhesive) or may otherwise be interposed between light guide layer 78 and reflector 80. Light 44-2 passes through quarter wave plate 110 twice. On a first pass, light 44-2 passes downwards through quarter wave plate 110 to reflector 80. Upon reaching reflector 80, this light is reflected back in upwards direction Z and makes a second pass through quarter wave plate 110 before passing upwards through light guide layer 78 to turning film 100. Together, the first and second passes of light 44-2 rotate the dominant polarization of light 44-2 by 90° into alignment with the dominant polarization of light 44-1.

Due to the operation of turning film 100 and half wave plate 106, light with the polarization of light 44-1 (i.e., light 74 that scatters upwards from the upper surface of light guide layer 78 and light 44-2 that has passed twice through quarter wave plate 110) may be rotated into alignment with the pass axis of polarizer 60 and transmitted through display layers 46 to serve as backlight 44. The presence of quarter wave plate 110 may therefore help to improve the efficiency with which downwards scattered light 44-2 can contribute to the backlight illumination produced by backlight unit 42.

If desired, wave plates such as layers 106 and 110 may be formed using structures that enhance viewing angle and reduce dispersion (e.g., Pancharatnam achromatic wave plate designs and/or Lyot wide-field-of-view wave plate designs).

The foregoing is merely illustrative and various modifications can be made by those skilled in the art without departing from the scope and spirit of the described embodiments. The foregoing embodiments may be implemented individually or in any combination.

What is claimed is:

1. A display, comprising:
   display layers forming an array of pixels, wherein the display layers include a reflective polarizer; and
   backlight structures that provide backlight illumination for the pixels, wherein the backlight structures include:
   a light guide layer;
   a light collimating film interposed between the light guide layer and the reflective polarizer;
   a half wave plate interposed between the light collimating film and the reflective polarizer;
   a backlight reflector; and
   a quarter wave plate interposed between the backlight reflector and the light guide layer.

2. The display defined in claim 1 wherein the light collimating film comprises a turning film.

3. The display defined in claim 2 wherein the reflective polarizer has a pass axis and wherein the turning film has a prism axis that is perpendicular to the pass axis.

4. The display defined in claim 3 wherein light exiting the turning film towards the half wave plate is characterized by a dominant polarization that is oriented at an angle with respect to the pass axis and wherein the half wave plate has an optical axis that bisects the angle so that the dominant polarization is rotated into alignment with the pass axis as the light that is exiting the turning film passes through the half wave plate.

5. The display defined in claim 1 wherein the reflective polarizer has a pass axis, wherein light exiting the light collimating film towards the half wave plate is characterized by a dominant polarization, and wherein the half wave plate is oriented so that the dominant polarization is rotated into alignment with the pass axis.

6. The display defined in claim 5 wherein the display layers include a liquid crystal layer.

7. The display defined in claim 6 wherein the display layers include an upper polarizer and wherein the liquid crystal layer is interposed between the upper polarizer and the reflective polarizer.

8. The display defined in claim 7 wherein the light collimating film comprises a turning film with elongated prisms that run along a prism axis and that face the light guide layer.

9. The display defined in claim 8 wherein the light guide layer comprises a polycarbonate layer.

10. The display defined in claim 8 wherein the reflective polarizer has a non-reflective polarizer film and a reflective polarizer film.

11. The display defined in claim 8 wherein the backlight structures include an array of light emitting diodes that emit light into an edge of the light guide layer along a direction that is perpendicular to the prism axis.

12. A display, comprising:
    display layers forming an array of pixels, wherein the display layers include a polarizer; and
    backlight structures that provide backlight illumination for the pixels, wherein the backlight structures include:
    a light guide layer into which light is provided by light-emitting diodes;
    a light collimating film interposed between the light guide layer and the polarizer;
    a half wave plate interposed between the light collimating film and the polarizer;
    a backlight reflector; and
    a quarter wave plate interposed between the backlight reflector and the light guide layer.

13. The display defined in claim 12 wherein the display layers include a layer of liquid crystal material.

14. The display defined in claim 13 further comprising an additional polarizer, wherein the liquid crystal material is interposed between the polarizer and the additional polarizer and wherein the polarizer comprises a reflective polarizer.

15. The display defined in claim 14 wherein the reflective polarizer is interposed between the liquid crystal layer and the half wave plate.

16. The display defined in claim 15 wherein the light-emitting diodes run along an edge of the light guide layer and wherein the light collimating film has grooves that run parallel to the edge.

17. The display defined in claim 12 wherein the reflective polarizer has a pass axis, wherein the light exiting the light guide layer towards the half wave plate has a dominant polarization that is oriented at an angle with respect to the pass axis, and wherein the half wave plate has an optical axis that bisects the angle.

18. A backlight for a liquid crystal display having a layer of liquid crystal material sandwiched between an upper polarizer and a lower polarizer, wherein the lower polarizer is a reflective polarizer having a pass axis, the backlight comprising:
    a light guide layer into which light is emitted by light-emitting diodes;
    a light collimating film interposed between the light guide layer and the reflective polarizer;

a half wave plate interposed between the light collimating film and the polarizer;
    a backlight reflector; and
    a quarter wave plate interposed between the backlight reflector and the light guide layer.

19. The backlight defined in claim 18 wherein the light collimating film comprises a prism film having prisms that face the light guide layer.

\* \* \* \* \*